United States Patent
Bruzzone et al.

(10) Patent No.: US 7,362,257 B2
(45) Date of Patent: Apr. 22, 2008

(54) WIDEBAND INTERFERENCE CANCELLATION USING DSP ALGORITHMS

(75) Inventors: Stephen P. Bruzzone, San Jose, CA (US); Robert E. Shanafelt, Los Altos, CA (US)

(73) Assignee: Radix Technology, Inc., Mountain View, CA (US)

( * ) Notice: Subject to any disclaimer, the term of this patent is extended or adjusted under 35 U.S.C. 154(b) by 91 days.

(21) Appl. No.: 11/318,071

(22) Filed: Dec. 23, 2005

(65) Prior Publication Data
US 2007/0296625 A1   Dec. 27, 2007

Related U.S. Application Data

(60) Provisional application No. 60/639,122, filed on Dec. 23, 2004.

(51) Int. Cl.
*G01S 13/00* (2006.01)
*G01S 7/292* (2006.01)

(52) U.S. Cl. .................. 342/13; 342/159; 342/162; 342/195

(58) Field of Classification Search ........ 342/159–165, 342/195, 13–19
See application file for complete search history.

(56) References Cited

U.S. PATENT DOCUMENTS

| | | | |
|---|---|---|---|
| 5,394,322 A * | 2/1995 | Hansen | 700/37 |
| 5,757,845 A * | 5/1998 | Fukawa et al. | 375/152 |
| 7,079,480 B2 * | 7/2006 | Agee | 370/204 |
| 7,110,349 B2 * | 9/2006 | Branlund et al. | 370/203 |
| 7,242,961 B2 * | 7/2007 | Hansen | 455/552.1 |

* cited by examiner

*Primary Examiner*—John B Sotomayor
(74) *Attorney, Agent, or Firm*—Pillsbury Winthrop Shaw Pittman LLP (57) ABSTRACT

A method and system is provided for detecting and characterizing pulsed threat radar emitters through heavy in-band interference. System includes an advanced digital signal processing method provides spatial and temporal interference cancellation, super-resolution direction-finding, and high resolution spectrum analysis techniques. The system receives the digitized output of a discriminator bank and produces highly accurate threat pulse radio frequency estimates. The invention further provides a two-channel configuration for a DF subsystem, to perform adjacent-beam direction-finding through severe interference environments. The invention provides increased sensitivity, increased frequency accuracy, and up to 40 dB of increased interference look-through capability in ES system but remains transparent to ES system functioning and to ES system operators.

28 Claims, 5 Drawing Sheets

WIDEBAND INTERFERENCE CANCELLATION USING DSP ALGORITHMS

CROSS-REFERENCE TO RELATED APPLICATIONS

This application claims the benefit of priority of U.S. Provisional Application Ser. No. 60/639,122, filed Dec. 23, 2004, which application is fully incorporated herein by reference.

GOVERNMENT LICENSE RIGHTS

The U.S. Government has a paid-up license in this invention and the right in limited circumstances to require the patent owner to license others on reasonable terms as provided for by the terms of contract No. N00178-05-C-3058 awarded by Naval Surface Warfare Center, Dahlgren Division.

BACKGROUND OF THE INVENTION

1. Field of the Invention

The present invention generally relates to radar signal processing systems. More particularly, the present invention relates to electronic support systems for detection of enemy radar surveillance and munitions targeting systems. More specifically, the present invention relates to systems for extracting information in the presence of interfering carrier wave signals.

2. Description of the Prior Art

Electronic support ("ES") systems are used by Navy ships and military aircraft to provide sensitive and timely detection of illuminating signals from enemy radar surveillance and munitions targeting systems, allowing adequate time for the targeted military vessel to successfully engage defensive and offensive counter-measures. ES systems continuously monitor a wide range of radio frequencies ("RF") for pulsed signals-of-interest ("SOI") indicative of radar illumination by the enemy. An effective ES capability is required to maximize situational awareness and respond quickly with electronic counter-measures ("ECM") for force protection when a threat is detected.

The effectiveness of current ES systems is being progressively diminished by increasing levels of RF interference. Current ES systems are based on instantaneous frequency measurement ("IFM") receiver processing that generally respond to the strongest frequency component in an input received from a single-element antenna or a multiple-element antenna array. Consequently, ES systems may be jammed or severely degraded by high-power in-band interference.

Particularly problematic is interference generated by own-ship RF emitters including on-board satellite communications links. The close proximity of own-ship emitters to the ES antenna array results in high-power jamming of the ES system. Moreover, even with the application of optimal known-waveform cancellation techniques, residual interfering signals may remain and may exceed interference tolerance levels of current ES systems.

The AN/SLQ-32 ES system is a typical ES system in widespread use and is a system that is susceptible to own-ship interference. The AN/SLQ-32 employs an IFM subsystem to generate pulse RF measurements and a direction-finding ("DF") subsystem to compute pulse direction-of-arrival ("DOA"). Each subsystem performs independent pulse detection operations, which are then associated by time to generate a single pulse descriptor word ("PDW") containing the combined attributes of time-of-detection ("TOD"), RF, and DOA for each detected pulse. Each merged PDW from these two subsystems is then forwarded as raw data to downstream PDW processing, where "de-interleaving" is performed to identify the individual pulsed emitters. The de-interleaving process accomplishes this function by sorting the PDWs into separate groups based on RF carrier frequency, DOA, TOD, etc. Both IFM and DF subsystems employ analog front-ends to achieve cost-effective broadband coverage for typical AN/SLQ-32 configurations which generally require significant quantities of the front-ends.

Figure 1:
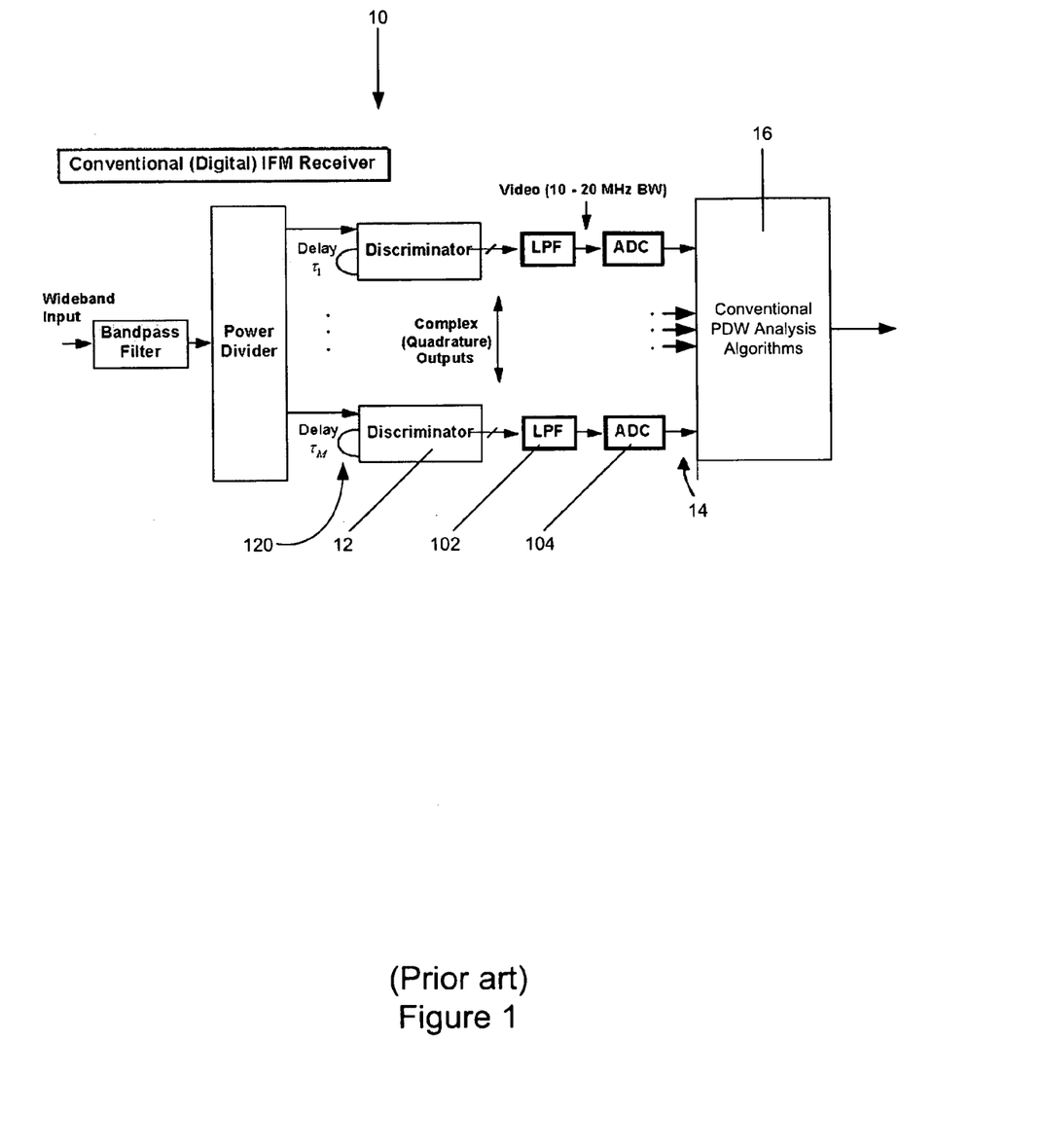
FIG. 1 is a block diagram representation of a prior art IFM receiver.

Referring to the block representation of FIG. 1, typical IFM subsystems 10 employ a single omni-directional antenna connected to a bank of analog mixer components called IFM discriminators 12. The IFM discriminators 12 are dual-input, dual-output devices where the outputs are provided as amplitude and differential phase measurements of the two inputs 120. An antenna signal is provided at one of the two inputs 120, and a time-delayed version of the antenna signal is presented at the other of the two inputs 120. The magnitude of the delay (also known as the delta-time) is designed to reveal the RF frequency of the dominant signal as a phase term. Generally, between four and eight discriminators 12 are used in a discriminator bank, and a set of time-delays is applied to achieve precision coarse-fine RF frequency measurements.

Interference vulnerability is a consequence of the methods used to process the output of the IFM subsystem. Current IFM processing methods assume that a pulse-of-interest is the dominant signal arriving at an antenna. Until recent years, this assumption was valid for two reasons: First, an illuminating radar signal was expected to be the strongest signal in the input because it must reach the target at high enough amplitude to make a return trip while retaining a detectable signature; second, because radar signals are low duty-cycle pulse trains, only one radar signal will generally be present at any given time, even when multiple radars are illuminating the same target. Hence, conventional IFM processing methods were adequate in the past despite this dominant-signal constraint. In recent years interference levels have increased substantially, to the point that radar signals are frequently weaker than one or several interfering continuous wave (CW, i.e., not pulsed) signals in the same band. These powerful CW interferers include close-by and own-ship communication systems, which are frequently the dominant signal in the IFM system input even when cooperative cancellation techniques are employed to reduce the self-interference levels. Hence, the modern interference environment is now violating the radar dominant signal operating assumption and consequently degrading or disabling IFM system functioning.

Typical DF subsystems deploy 17 directional reception beams fanned uniformly to cover a 90-degree quadrant. DOA measurements are obtained by comparing the received amplitudes in these beams. Because a receiver and processor must be provided for each beam, the beam processing equipment must be small, inexpensive and use low-power. Note, however, that the nature of the directional beam reception pattern facilitates the goals of cost, size and power because the number of interferers falling within the beam is reduced and sensitivity in the look direction is inherently increased. Accordingly, a simple device known as a crystal video receiver ("CVR") is used at each beam output. The CVR is a single-input, single-output device capable of detecting a strongest signal within the beam and further capable of estimating the amplitude of the strongest signal. However, as is the case with the IFM subsystem, the presence of interference may jam the CVR and causes erroneous amplitude readings that degrade or invalidate DF operation.

Referring again to FIG. 1, currently deployed ES systems are required to monitor wide bandwidths while providing instantaneous response to pulses arriving anywhere in the band. A variety of IFM receivers have been developed that can monitor bands as wide as 16 GHz. Most of these receivers employ a bank of wideband delay line discriminators 12, the outputs of which are passed through a low-pass filter 102 and digitized 104 to generate the so-called digitized video output 14. The video output 14 is then digitally processed to estimate the frequency of an illuminating pulsed SOI. The delay line discriminators 12 often use micro strip technology and coaxial delay lines to achieve the needed hardware reliability and efficiency. Typically, between 4 and 8 discriminators 12 are used in a bank.

A typical product employs logarithmically spaced discriminator delays to compute signal frequency. The shortest discriminator delay $\tau$ is selected to yield unambiguous coverage of the desired RF band, where:

$$\tau = 1/(f_{max} - f_{min}).$$

The phase of this first discriminator traverses one 360-degree revolution across the desired RF range, providing a coarse frequency readout. Typically, the next discriminator in the bank uses twice this delay and traverses two full phase revolutions across the RF range, providing a finer resolution measurement. The third discriminator uses four times the basic delay and traverses four full phase revolutions across the range, and so on to increasingly finer resolution. Other products employ the "binary word" approach, in which linearly spaced delays are used to derive a binary frequency word directly from the bank outputs using voltage comparators. Both of these conventional approaches analyze the angle of the discriminator output, and are therefore subject to two major limitations: performance is optimal only if the SOI pulses are the strongest signal in the antenna; and, approximate low-pass and high-pass filtering techniques known respectively as AC coupling and DC coupling must be used to separate SOI pulse components from carrier wave ("CW") interference components in the IFM bank video output. However, these products frequently fail to provide the needed discrimination between the different types of signals.

The loss of performance with decreasing signal-to-interference ratio ("SIR") is an obvious drawback because it makes the ESM system susceptible to simple CW jamming or capture by other incidental, strong signals. But the use of AC/DC coupling separate pulse and CW components creates system vulnerabilities whether or not jamming is in use, and introduces performance degradation due to reasons including: the inability to separate pulsed and CW emitters unless the CW emitters maintain constant amplitudes; and ineffective separation of pulsed and CW emitters as pulse duration increases.

A common approach to mitigate these drawbacks is to deploy notch filters and to remove the CW interferers before they reach the IFM discriminator bank. While these approaches provide limited mitigation of the problems when a small number of large-amplitude CW interferers are present, they usually require onerous manual operation and they often present other problems. For example, the need to cover wide bandwidth necessitates the use of analog filters which limit the ability to generate narrow notches using even the best of current analog technologies. Excessive notch width distorts the pulsed signal-of-interest (SOI) and limits the number of notches that can be deployed without severely degrading the required pulse measurements.

Therefore, what is needed is a method and system for retrofitting IFM-based ES systems that handles interference environments, and improves the threat pulse detection and measurement functions over a broad range of interference and noise conditions.

SUMMARY OF THE INVENTION

A method for retrofitting instantaneous frequency measurement ("IFM") processing systems to detect and characterize pulsed threat radar emitters through heavy in-band interference. The method and system are effective in counteracting the effects of strong emitters including own-ship emitters in the 2-18 GHz radio frequency bands. The invention provides an advanced digital signal processing ("DSP") method that can be employed retroactively in existing IFM-based ES systems to handle interference environments, and to improve the threat pulse detection and measurement functions over a broad range of interference and noise conditions.

The invention provides a novel processing method using DSPs, the method hereinafter referred to as instantaneous frequency measurement dominant mode prediction ("IFM-DMP"). IFM-DMP provides a low-cost, low-risk capability upgrade which may be retrofitted into conventional IFM receiver architectures. IFM-DMP may be applied in spatial (antenna array) and temporal (frequency domain) systems in the 2-20 GHz band. IFM-DMP combines elements from spatial and temporal interference cancellation, super-resolution direction-finding, and high resolution spectrum analysis techniques.

IFM-DMP comprises a DSP processor that connects to the digitized video output of a conventional IFM discriminator bank. IFM-DMP is typically inserted in place of conventional pulse detection and frequency measurement logic, where it generates pulse-descriptor words (PDWs) delivering greater sensitivity, accuracy, and robustness than prior art methods. In particular, IFM-DMP continues to detect SOI pulses and generate accurate PDWs in heavy interference environments that cause catastrophic failure of existing methods. Aside from these performance benefits, IFM-DMP processing is transparent to the ES system, and the downstream PDW processing algorithms utilize the IFM-DMP output PDWs without any modifications, i.e., as though they were generated by conventional methods.

The invention provides a single-channel IFM-DMP configuration that produces highly accurate threat pulse radio frequency estimates for IFM applications. The invention further provides a two-channel configuration for a DF subsystem, to perform adjacent-beam direction-finding through severe interference environments. In some embodiments, a modest IFM architecture using, for example a four-discriminator system replaces existing DF processors in the DF subsystem. The invention provides increased sensitivity, increased frequency accuracy, and up to 40 dB of increased interference look-through capability in ES system but remains transparent to ES system functioning and to ES system operators.

BRIEF DESCRIPTION OF THE DRAWINGS

These and other aspects of an embodiment of the present invention are better understood by reading the following detailed description of the preferred embodiment, taken in conjunction with the accompanying drawings, in which.

DETAILED DESCRIPTION OF THE INVENTION

The present invention will now be described in detail with reference to the drawings, which are provided as illustrative examples of the invention so as to enable those skilled in the art to practice the invention. Notably, the figures and examples below are not meant to limit the scope of the present invention. Where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration.

For the sake of clarity, the description discusses an exemplary embodiment in which the invention is applied as a retrofit to an AN/SLQ-32 ES system, which may be considered typical of ES systems.

Figure 2:
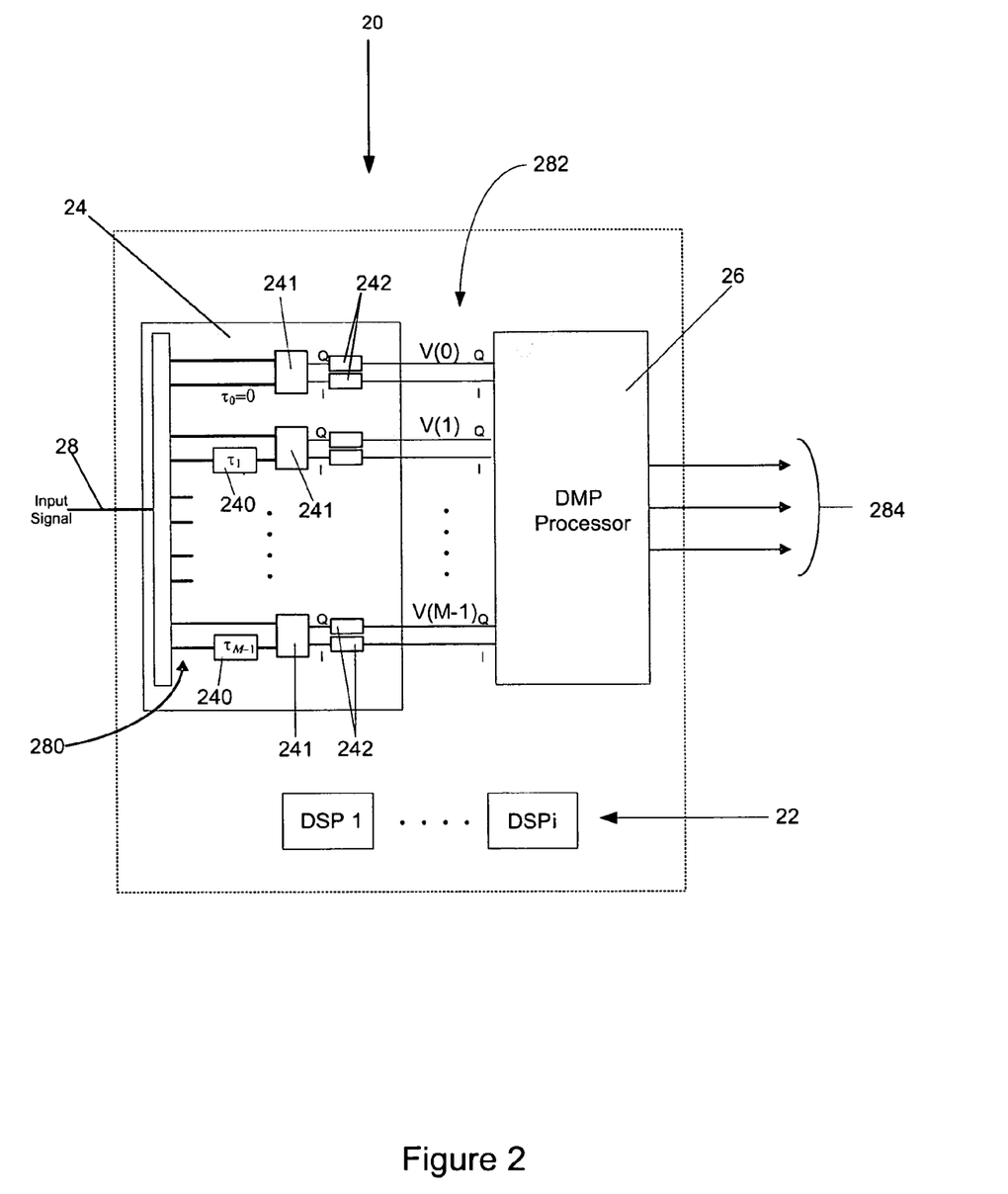
FIG. 2 is a block diagram illustrating an embodiment of the present invention.

Referring to FIG. 2, a block representation of an exemplary embodiment of the invention is depicted. In some embodiments of the invention, an IFM-DMP processor 20 comprises a plurality of DSP processing components 22, an IFM processor 24 and a DMP processor 26, wherein the IFM processor 24 and the DMP processor 26 may be implemented as a combination of hardware and software components.

The IFM processor 24 may be configured to receive a wideband input signal 28, split the wideband input signal 28 and apply the split signals 280 to a bank of time-delays 240 that in turn provide input (along with undelayed input signal 280) to a selected number (M) of discriminators 241 (hereinafter referred to as bank of discriminators 241). The bank of discriminators 241 is typically adapted to use a sequence of linearly increasing time delays ($\tau_1$-$\tau_{M-1}$), as well as a zero delay ($\tau_0$=0) to produce a vector (V(0)-V(M-1)) 282 of an autocorrelation function ("ACF") containing M elements. Each of the V(i), i=0, ..., M-1, is a complex voltage that represents the dual (sine and cosine) outputs such as generated by a conventional IFM discriminator. In an all-digital implementation, the complex voltage V(i) represents the in-phase and quadrature (I and Q) outputs of a digitally implemented discriminator. In either case, the zeroeth lag V(0) is a single (cosine) output that represents the input signal power. The autocorrelation vector 282 may be processed by the DMP processor 26 to produce a plurality of output signals 284 that contain useful threat analysis information. In the exemplary embodiment, the IFM-DMP processor 20 may be inserted into an existing ES system (AN/SQL-32 ES, for example) to provide improved system performance.

In some embodiments the wideband input signal 28 may be received in analog form and may be digitized by the IFM processor 24 after the time-delay discrimination operation is performed in analog hardware. For example, the output of a bank of M analog discriminators 241 may be filtered and digitized by 2M−1 analog-to-digital converters ("ADC") 242, using any suitable analog-to-digital conversion technique familiar to one skilled in the art. It will be appreciated that the ADCs 242 provide a digital representation of a signal level measured during a sample interval. In some embodiments, the autocorrelation vector 282 may be received from a bank of external IFM discriminators and the externally-generated autocorrelation vector 282 may be received in digital form. In other embodiments, the wideband input signal 28 may be received in digital form, and the IFM processor 24 may be implemented entirely in DSP, including the time-delays 240 and the discrimination functions 241.

Figure 3:
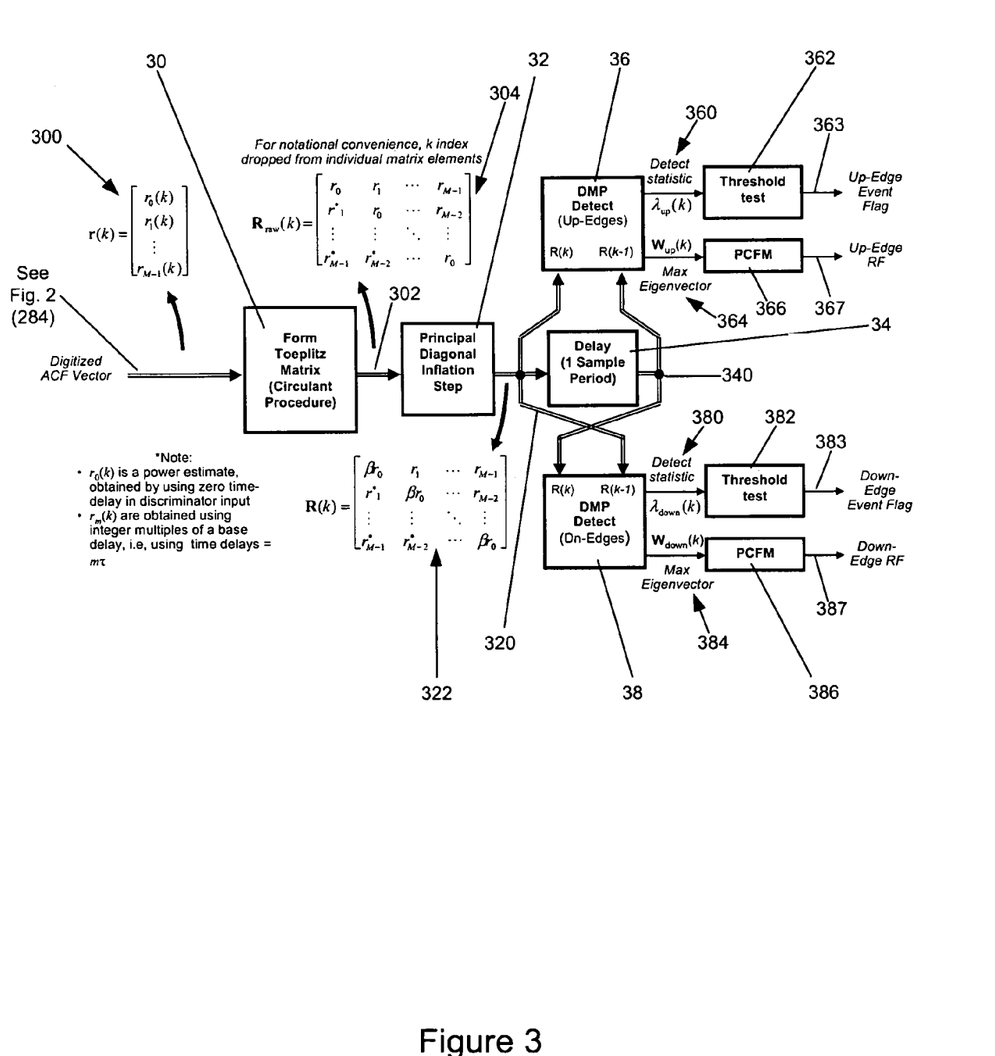
FIG. 3 is a flow chart of the DMP process incorporating mathematical representations of signal state throughout the process.

Referring now to FIGS. 2 and 3, the operation of the DMP processor may be more clearly understood. FIG. 3 is a flowchart representing the operation of the exemplary embodiment of the DMP processor 26. A digitized autocorrelation vector [V(0), V(1), ..., V(M−1)] 282, henceforth denoted by r(k)=[$r_0$(k), $r_1$(k), ..., $r_{M-1}$(k)] 300 to adopt the conventional ACF notation, is received by the DMP processor 26 at sample instant k. The autocorrelation vector may be generated by an IFM processor 24 using a set of linearly-spaced delay-line values 240 wherein a delay $\tau_i$ for each linearly-spaced value is set to an integer multiple of a basic (minimum) delay $\tau$, such that:

$$\tau_i = i \times \tau,$$

where $\tau$ may be selected to provide unambiguous coverage of a targeted RF band.

Each discriminator 241 provides sine and cosine outputs, which are passed through low-pass filters and analog-to-digital converters ("ADCs") 242, such that the low-pass filters may exclude frequencies above a maximum pulse bandwidth. Thus, the bank of discriminators 241 generates a vector of ACF 300, containing the first M lags of the input data ACF. It will be appreciated that the autocorrelation vector 300 is the average ACF output over the current ADC sample interval.

It will be further appreciated that for a single carrier wave ("CW") input, each correlation output has an angle equal to the change in CW signal carrier phase occurring over the associated it time-delay interval. Accordingly, the vector of complex outputs from the bank of discriminators 241 is a truncated complex tone, M samples long, whose frequency is proportional to the RF location in the ($f_{min}$, $f_{max}$) range, relative to the basic delay $\tau$, and whose amplitude is proportional to the received CW signal power.

Referring still to FIGS. 2 and 3, the DMP processor (at 30) forms a data covariance matrix 304 (a Toeplitz Matrix, reproduced, below) at each sample instant k using successive digitized autocorrelation vectors 300. Each successive autocorrelation vector 300 is a digitized vector sample representing the latest estimate of the complex autocorrelation vector for the received data as averaged over the sample interval by anti-aliasing low-pass filters and the ADCs 242. As a first step, the current raw covariance matrix estimate $R_{raw}(k)$ 304 is generated at step 30 from the current autocorrelation vector sample r(k) 300 at sample instant k by rearranging its elements as follows:

$$R_{raw}(k) = \begin{bmatrix} r_0 & r_1 & \cdots & r_{M-1} \\ r_1^* & r_0 & \cdots & r_{M-2} \\ \vdots & \vdots & \ddots & \vdots \\ r_{M-1}^* & r_{M-2}^* & \cdots & r_0 \end{bmatrix}$$

where $r_i$, i=0,...,M-1 are digitized video samples from the M IFM discriminators 241 using delays of iτ. Note that a zero-delay discriminator is included to compute $r_0$, which is an estimate of the total input power to the bank of discriminators 241.

Mathematical Description of IFM-DMP

Referring still to FIGS. 2 and 3, the DMP processor (at 30) forms a data covariance matrix 304 (a Toeplitz Matrix, reproduced, below) at each sample instant k using successive digitized autocorrelation vectors 300. Each successive autocorrelation vector 300 is a digitized vector sample representing the latest estimate of the complex autocorrelation vector for the received data as averaged over the sample interval by anti-aliasing low-pass filters and the ADCs 242. As a first step, the current raw covariance matrix estimate $R_{raw}(k)$ 304 is generated at step 30 from the current autocorrelation vector sample r(k) 300 at sample instant k by rearranging its elements as follows:

where $r_i$, i=0, . . . , M-1 are digitized video samples from the M IFM discriminators 241 using delays of iτ. Note that a zero-delay discriminator is included to compute $r_0$, which is an estimate of the total input power to the bank of discriminators 241.

Principal Diagonal Inflation ("PDI")

Next $R_{raw}(k)$ 304 may be processed to minimize the effects of hardware error sources, including: delay-line time-delay variances and offsets; IFM discriminator gain variances and offsets; and, IFM discriminator phase variances and offsets. Time variations in the hardware error sources may originate from a variety of physical sources including shock, vibration, and temperature variations, as well as manufacturing tolerances. Without compensation, errors tend to increase (degrade) the condition number of the matrix $R_{raw}(k)$ 304 which, in turn, can degrade the detection and frequency estimation performance of the IFM-DMP algorithm.

To counteract the effect of hardware errors, at step 32, a principal diagonal inflation ("PDI") process may be applied to increase the weighting on the zeroeth lag power measurement ($r_o$) by a fixed factor. This weighting increases the magnitude of the matrix principal diagonal, which is guaranteed to be a positive value, thereby reducing (improving) the condition number of the matrix. Specifically, the PDI process of step 32 scales the zero-delay discriminator output, $r_0$, upward by a factor β>1, which results in a stabilized covariance matrix R(k) 322 defined by:

$$R(k) = \begin{bmatrix} \beta r_0 & r_1 & \cdots & r_{M-1}^* \\ r_1^* & \beta r_0 & \cdots & r_{M-2}^* \\ \vdots & \vdots & \ddots & \vdots \\ r_{M-1}^* & r_{M-2}^* & \cdots & \beta r_0 \end{bmatrix}.$$

The PDI process of step 32 does not disturb any of the signal-related or interference-related information needed for IFM processing.

Pulse-Edge Detection ("PED")

The DMP process continues with the detection of edges in an input signal at steps 36 and 38. In mathematical terms, detection of signal up-edges at step 36 is achieved by monitoring the maximum eigen value $\lambda_{max}$ of the generalized eigen equation:

$$\lambda(k)R(k-1)w_{up}(k)=R(k)w_{up}(k)$$

$$\lambda_{max} = \max_k \lambda(k).$$

A constant false-alarm rate ("CFAR") threshold is maintained and, at steps 362 and 382, is applied to the detection statistic $\lambda_{up} \equiv \lambda_{max}$, 360 at each sample instant k. The $\lambda_{max}$ statistic is a maximum-likelihood (best-fit) estimate of the newly-up pulse power when the up-edge occurs precisely between sample instants k-1 and k. The optimality of this statistic enables it to serve not only as a reliable power estimate, but also as a reliable relative-power comparison when used in adjacent-beam DF applications.

When the pulse up-edge does not occur precisely between time samples k and k-1, $\lambda_{max}$ is the maximum likelihood estimate of the power change between these sample instants, which can underestimate the full signal power. This uncertainty in the detected pulse power measurement can be largely eliminated by the simple practice of using an adjustable time-gap in the formulation, whereby all processing is done on time instants k and k-L, and where L is set to a desired integer number of gap samples. Typically, L is set slightly larger than the maximum expected pulse rise-time, guaranteeing that at some time the pulse will be entirely absent in sample k-L and up to full power in sample k. That time-instant k is detected as the maximum occurring $\lambda_{max}$ when several detection threshold crossings occur consecutively.

Pulse Carrier Frequency Measurement ("PCFM")

Next, Pulse Carrier Frequency Measurement ("PCFM") may be performed at step 366. When an up-edge is detected, $w_{up}$ 364 is set to the maximum eigenvector of the eigenequation, such that:

$$w_{up} = w_{max} \equiv \arg\max_{w \in C^M} \frac{w^H R(k) w}{w^H R(k-1) w},$$

where $w_{up}$ contains interference-cancelled frequency information regarding the detected up-edge. A carrier frequency measurement vector v is then generated internally within PCFM at step 366 as follows:

$$v = w_{up}^H R(k).$$

The vector v takes the form of a single, truncated tone (to a reasonable approximation) wherein the tone frequency represents the frequency of the detected pulse. This frequency can be efficiently estimated by computing the average tone phase change between adjacent elements of vector v.

Hence, the PCFM frequency measurement is calculated according to $$f_{SOI} = \frac{1}{2\pi} \text{angle}\left(\sum_{m=1}^{M-1} v_{m+1} v_m^*\right),$$

yielding a value $f_{SOI}$ in normalized frequency (ranging from −0.5 Hz to +0.5 Hz), of the detected signal-of-interest ("SOI") pulse radio frequency at time-sample k. SOI pulse absolute radio frequency may be computed from $f_{SOI}$ using the absolute frequency to normalized frequency relationship:

$$f_{normalized} = f_{RF}\tau - I[f_{RF}\tau]$$

where I[ ] is the integer rounding function, $f_{RF}$ is the radio frequency, and τ is the IFM bank basic delay, i.e.

$$\tau = 1/(f_{max} - f_{min}).$$

It can be shown that the frequency estimate, $f_{normalized}$ approaches the maximum likelihood single-tone frequency estimator for moderate to high signal-to-noise ratio ("SNR") tone-burst vector v.

Extension for Down-Edge Monitoring

Down-edge detection at step 38 and frequency measurement 386 are accomplished simply by reversing the roles of R(k) and R(k−1) in the method (and mathematical representations) discussed above. Having detected up-edges 363 and down edges 383, pulse duration measurements may be obtained by finding the best match between a down-edge frequency measurement 387 and a set of recent up-edge frequency measurements 367. Embodiments of the invention provide an association algorithm that includes a frequency distance metric to dismiss unmatchable down-edges, and pulse duration limits to screen out pulses outside the targeted threat signal list.

Sensitivity Advantages of Eigensolution Algorithms

IFM-DMP has a coherent processing advantage over conventional IFM processing. Whenever a mode change occurs in the covariance matrix, indicative of a signal up-edge or down-edge, the IFM-DMP eigen-equations automatically combine the elements of the delay-line video M-vector τ, used to form R(k), to maximize the SNR of the detected carrier frequency tone resident in r. When little or no interference is present, this coherent combining increases system sensitivity by 10 log(M) dB, as a result of combining M discriminator outputs. Both detection and frequency estimation reap this same benefit, improving both functions as if the SOI SNR in the discriminator outputs were increased by this same factor. The frequency estimate becomes essentially a best-fit tone approximation to the discriminator output phases occurring across the bank.

Embodiments of the invention provide IFM-DMP configurations that maximize aspects of IFM-DMP functioning according to hardware capabilities. For example, embodiments accommodate cost-effective implementations that maximize performance using a smallest possible number of IFM discriminators to process a given RF signal.

Figure 4:
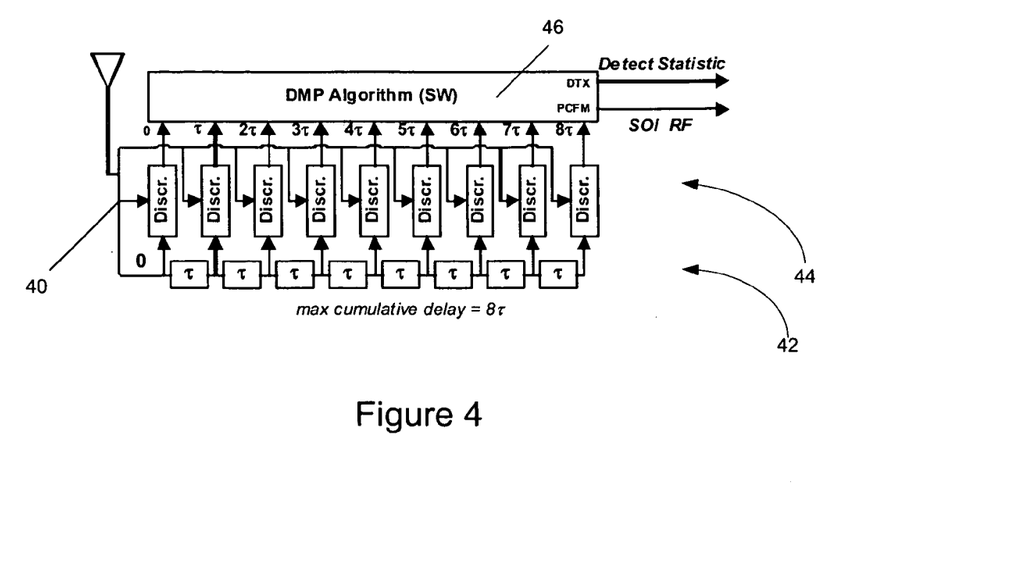
FIG. 4 is a diagram illustrating an embodiment of the invention featuring a single zoom configuration of the IFM-DMP.
Figure 5:
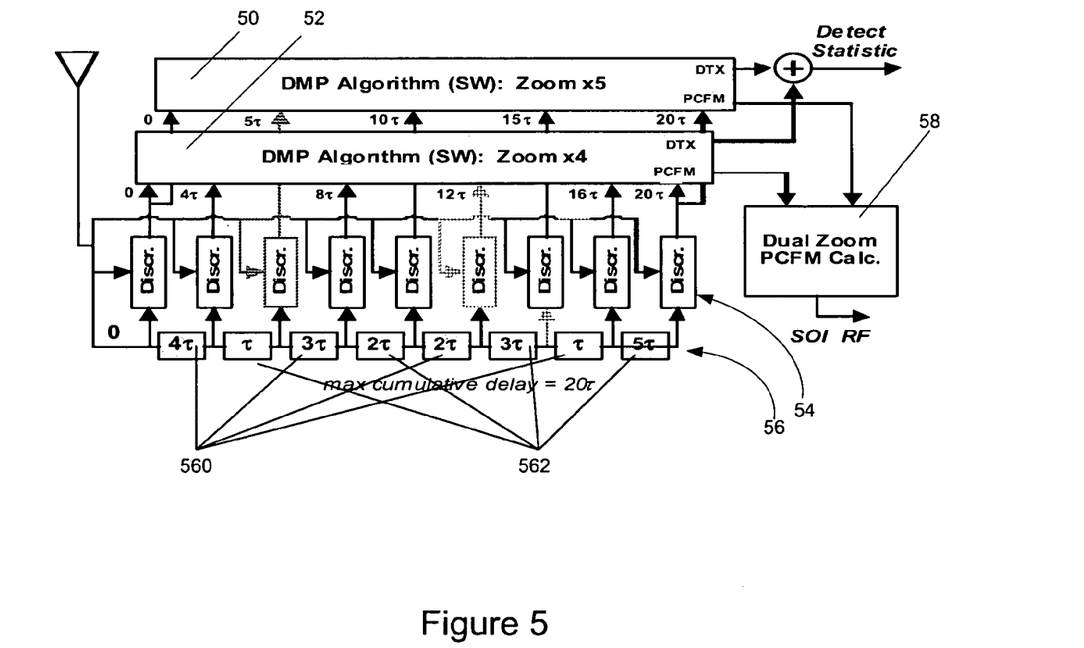
FIG. 5 is a diagram illustrating an embodiment of the invention featuring a double zoom configuration of the IFM-DMP.

Referring now to FIGS. 4 and 5, embodiments of the invention utilize a plurality of IFM-DMP processors to obtain additional information from a wideband input signal. For example, some embodiments of the invention provide direction finding ("DF") and dual-zoom capability. The dual-zoom capability uses larger time-delays than basic DMP embodiments to yield finer frequency resolution in the PCFM operation. The use of larger time-delays also improves the detection sensitivity of the pulse edge detection ("PED") stage, especially when CW signals are located on the frequency spectrum overlapping or near to the frequency of targeted pulse signals. Embodiments of the invention also implement adjacent beam DF as an extension of the basic IFM-DMP system providing dual-beam processing to enable adjacent-beam DF measurements.

The Single and Dual-Zoom IFM-DMP Configurations

Referring now to FIGS. 4 and 5, exemplary embodiments of a single IFM-DMP configuration (FIG. 4) and a dual-zoom IFM-DMP (FIG. 5) are shown. For illustrative purposes, both configurations are described in this section as having a total of nine IFM discriminators 44 and 54. Additionally, and for the purpose of clarity, the exemplary illustrations of FIG. 4 and FIG. 5 show cascaded delay-lines 42 and 56 feeding the nine IFM discriminators 44 and 54. It will be appreciated that each discriminator 44 and 54 may be adapted to receive and use a delayed signal where the delay is created individually for each discriminator 44 and 54. Further, it will be appreciated that the DMP processors 46 and 50 and 52 may be implemented in hardware and software and may include PED and PCFM stages.

FIG. 5 depicts an exemplary embodiment of the invention that provides a dual-zoom IFM-DMP configuration using nine discriminators 54. The dual-zoom configuration contains two shorter instantiations 50 and 52 of the IFM-DMP linear-delay configuration described previously with each instantiation provided with a base delay set to an integer multiple of a selected value τ selected to yield unambiguous coverage of the ($f_{min}$, $f_{max}$) RF frequency range. The integer τ-multipliers may be selected to provide a significant frequency resolution advantage over the single IFM-DMP configuration, by providing the individual IFM-DMP processors with maximum delay values significantly larger than that of the single IFM-DMP configuration based on an equivalent number of discriminators.

A Zoom ×5 IFM-DMP element 50 may comprise a five-discriminator bank (indicated at 562) using time-delays including, for example 0, 5τ, 10τ, 15τ, and 20τ. The Zoom ×4 IFM-DMP element 52 may comprise a six-discriminator bank (indicated at 560) using time-delays including, for example, 0, 4τ, 8τ, 12τ, 16τ, and 20τ. Such a configuration of delay increments (of 4τ and 5τ) is referred to hereinafter as a nine-discriminator dual-zoom (4,5) IFM-DMP configuration. Only nine IFM discriminators 54 are needed to implement this particular dual-zoom (4,5) configuration because the Zoom ×4 processor 52 and the Zoom ×5 processor 50 share a zero-delay discriminator and a 20τ delay discriminator. For a nine-discriminator configuration, the multiplier factors of four and five may provide an optimum choice. For example, the use of multiplier factors of three and four yields a five-bank/six-bank dual configuration where the maximum delays are 15τ and 16τ resulting in a configuration that may provide inferior frequency resolution in comparison to a configuration using a 20τ maximum delay.

A dual-zoom detection statistic may be formed by summing individual detect statistics 58 from the two constituent DMP processors 50 and 52. Should conditions of near-frequency overlap occur between the SOI pulses and CW interferers, the dual-zoom detection statistic may yield significantly improved performance over a single IFM-DMP configuration using the same number of discriminators because it may provide higher SOI pulse detection sensitivity at the same constant false-alarm rate ("CFAR") operating point.

PCFM Calculation for Dual Zoom IFM-DMP Configurations

The use of excessively large basic delays in individual IFM-DMP elements may cause individual IFM-DMPs to generate frequency-ambiguous PCFM measurements which, it may be appreciated, are analogous to aliased spectra. These ambiguities may be resolved using a dual-zoom PCFM combining operation that exploits the incommensurate integer-multiple delays in the two DMPs 50 and 52 (in effect summing their individual spectra to resolve the ambiguities). It may be appreciated that such an operation is analogous to interferometer processing in that the operation may exploit different frequency wrapping factors to reinforce the SOI at its true frequency location, while simultaneously preserving frequency resolution advantages of larger delays. In some embodiments the following PCFM combining procedure may be applied:

1. Compute the PCFM estimate for each individual zoom IFM-DMP, denoting the estimates as $f_{ZOOM\ 1}$ and $f_{ZOOM\ 2}$.
2. Generate the set of aliased normalized frequencies for each zoom IFM-DMP, where the zoom IFM-DMP delays of $p\tau$ and $q\tau$ (with p and q integers) corresponds to sets $F_1$ and $F_2$ of aliased normalized frequencies given by:

$$F_1 = \left\{ f_i = f_{ZOOM1} + \frac{i}{p} \mid -.5 \leq f_i \leq .5 \right\}$$
$$F_2 = \left\{ f_i = f_{ZOOM2} + \frac{i}{p} \mid -.5 \leq f_i \leq .5 \right\}.$$

3. Find the point of closest approach between the elements of $F_1$ and $F_2$. These two elements will tend to have nearly identical frequency values.
4. Compute the dual-zoom IFM-DMP PCFM estimate as the average of these two frequency values.
5. Calculate $f_{normalized}$ to convert back to absolute (radio) frequency as discussed above.

IFM-DMP Configuration for Adjacent-Beam DF

Figure 6:
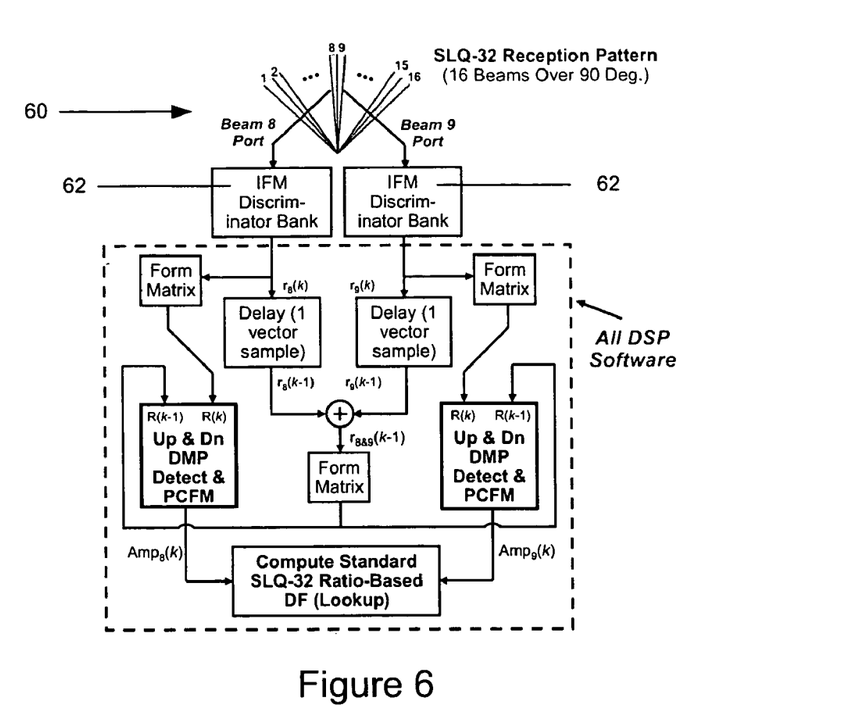
FIG. 6 is a diagram illustrating an embodiment of the invention adapted to perform as a direction finding subsystem.

Referring now to FIG. 6, an exemplary embodiment of the invention is illustrated that may be used with an AN/SLQ-32 DF subsystem to determine direction of arrival ("DOA") of a signal of interest ("SOI"). The determination of DOA is normally achieved by measuring a pulse-response power ratio of signal output from two adjacent beam ports in a fanned-beam collection array 60, and subsequently computing a pulse angle of arrival from a look up table or similar power-based direction finder ("DF") algorithm. FIG. 6 depicts a set of 16 beam patterns 60 covering a +/−45° sector where, for example, the SOI pulse is received at a highest power level in the eighth and ninth beams. The detected outputs from the eighth and ninth beam pair of CVRs may be used to feed the power ratio-based pulse DF lookup operation.

Figure 7:
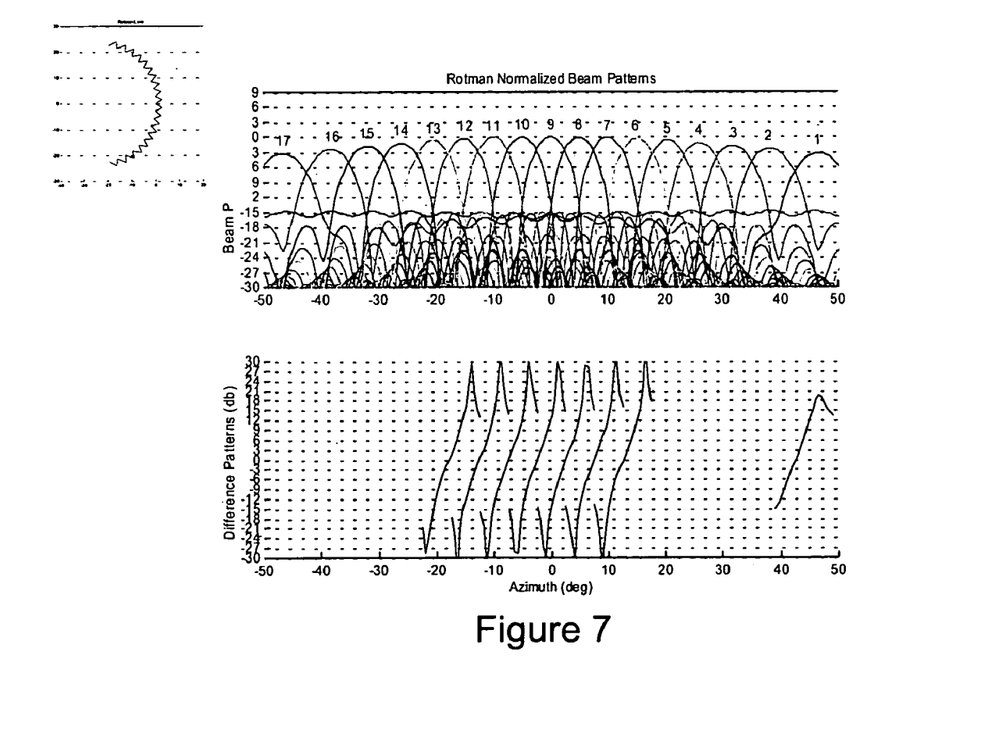
FIG. 7 is a graphical representation of Rotman lens beam patterns and difference patterns for the DF subsystem.

It will be appreciated that a broadband beam-former such as a Rotman lens may be used to form these beams such that they overlap at nearly their 3 db points across the band. The Rotman beam-former provides the advantage that the full set of beams may be formed simultaneously using a common aperture. A difference pattern may be formed from log crystal video detector outputs by determining which two adjacent beam ports have the largest response to the incoming pulse, and taking the difference to form the log of the ratio. In this case, $$AOA = C \times (\log(A) - \log(B)) = C \times \log\left(\frac{A}{B}\right),$$

where C is a constant that converts the log of the ratio into angle of arrival ("AOA"), or alternatively C is the result of a lookup table or more sophisticated DF algorithm based on the difference of the log outputs. FIG. 7 depicts typical Rotman lens beam patterns and difference patterns for a typical monopulse scheme DF subsystem.

The presence of one or several CW or interfering signals in the monopulse scheme described above may introduce a significant DF error. An IFM-DMP processor may be connected to the output of each beam port enabling the log of the magnitude of the dominant beam-pair detection statistics ($\lambda_{max,i}$, $\lambda_{max,i+1}$) to be used to form an accurate monopulse ratio as discussed above, in the presence of interference. In addition, the IFM-DMP processor may add a pulse carrier frequency measurement to each beam output, which can be used to pinpoint a correct beam-pair (based on consistent frequency estimates) to use for each DF operation in busy RF environments.

In some embodiments, a relatively small number of discriminators may be implemented for each IFM-DMP beam processor, thereby optimizing hardware costs. However, a reduction in the number of discriminators may constrain embodiments to use single IFM-DMP configurations, because, for example, a four-stage discriminator bank may cause degradation of performance in a dual-zoom configuration by providing only one nonzero delay to one of its two constituent IFM-DMP processors. In some embodiments, limiting the number of stages may compromise a single IFM-DMP configuration frequency measurement accuracy more than its detection performance (relative to its nine-stage counterpart), which befits its DF subsystem role and preserves the fine frequency measurement role of the IFM subsystem.

Referring again to FIG. 6, in the exemplary embodiment depicted, the SOI pulse may be received at a highest power in beams eight and nine. In this embodiment, each beam output connects to a four-stage single IFM-DMP configuration 62. However, the DF configuration may use a modified IFM-DMP algorithm to gain a common amplitude reference for the two paired beams. The digitized video output of the IFM discriminator bank for the ith beam at sample time k is denoted in FIG. 6 by $r_i(k)$, which may be used (as discussed previously) to form the raw covariance matrices $R_{raw,i}(k)$ from its individual elements $r_0$ through $r_{M-1}$. The algorithm software modification focuses on the prior-sample (and PDI-stabilized) covariance matrix $R(k-1)$. Specifically, the individual beam prior-sample raw covariance matrices, defined as $R_{raw,i}(k-1)$ and $R_{raw,i+1}(k-1)$ for adjacent beams i and i+1, may be replaced by their average, such that:

$$R_{raw,pair\ i}(k-1) = [R_{raw,beam\ i}(k-1) + R_{raw,beam\ i+1}(k-1)]/2.$$

PDI may then be applied to $R_{raw,pair\ i}(k-1)$ to produce the stabilized covariance matrix $R_{pair\ i}(k-1)$. DMP processing may be performed on each beam using this substitute prior-sample covariance matrix. This modification places the DMP detection statistics ($\lambda_{max,i}$, $\lambda_{max,i+1}$) (which serve as beam SOI power estimates) over a "common denominator" so that the SOI pulse power ratio in the two beams may be preserved. Otherwise, differing interference amplitudes in the two beams would have the potential to impose slightly different gains on these two statistics, which would distort their amplitude ratio and degrade the subsequent DF lookup result.

Although the present invention has been particularly described with reference to embodiments thereof, it should be readily apparent to those of ordinary skill in the art that changes and modifications in the form and details thereof may be made without departing from the spirit and scope of the invention. For example, those skilled in the art will understand that variations can be made in the number and arrangement of components illustrated in the above block diagrams. It is intended that the appended claims include such changes and modifications.

What is claimed is:

1. A method for extracting information in the presence of interference comprising the steps of:
   applying a first signal to a plurality of discriminators to obtain successive digitized vectors representative of the first signal;
   deriving a sequence of data covariance matrices from at least some of the digitized vectors; and
   generating desired information by processing the sequence of covariance matrices using dominant mode prediction.

2. The method of claim 1 wherein the desired information includes an up-edge.

3. The method of claim 2 wherein the desired information includes a pulse carrier frequency measurement associated with the up-edge.

4. The method of claim 1 wherein the desired information includes a down-edge.

5. The method of claim 4 wherein the desired information includes a pulse carrier frequency measurement associated with the down-edge.

6. The method of claim 1 wherein the desired information includes an up-edge and a down-edge.

7. The method of claim 6, wherein the selected information includes:
   a first pulse carrier frequency measurement associated with the up-edge;
   a second pulse carrier frequency measurement associated with the down-edge; and
   a pulse duration, wherein the pulse duration is measured by matching the first pulse carrier frequency measurement with the second pulse carrier frequency measurement.

8. The method of claim 1 wherein the sequence of data covariance matrices includes one or more time series of matrices, each of the one or more time series matrices comprising a portion of the digitized vectors.

9. The method of claim 1 and further comprising the steps of:
   obtaining a second series of successive digitized vectors representative of a second signal, the first signal and the second signal being received from adjacent beam ports; and
   processing the second series of successive digitized vectors to obtain a direction of arrival of a pulse.

10. The method of claim 9 wherein the second series of successive digitized vectors comprises a set of digitized vectors obtained from a port of a multi-port direction finding radar warning receiver system and wherein the selected information includes a direction of arrival associated with the signal.

11. A system for canceling interference, comprising:
    a plurality of discriminators configured to generate a series of digitized vectors of an autocorrelation function for a signal; and
    one or more dominant mode prediction processors adapted to cancel interference associated with the signal, wherein
    the interference is cancelled by application of a plurality of signal processing algorithms to the series of digitized vectors.

12. The system of claim 11 wherein the interference includes wideband interference.

13. The system of claim 11 wherein the interference includes narrowband interference.

14. The system of claim 11 wherein the plurality of signal processing algorithms includes an edge detection algorithm.

15. The system of claim 11 wherein the plurality of signal processing algorithms includes an algorithm for measuring a pulse carrier frequency associated with an up-edge.

16. The system of claim 11 wherein the plurality of signal processing algorithms includes an algorithm for measuring a pulse carrier frequency associated with a down-edge.

17. The system of claim 11 wherein the plurality of signal processing algorithms includes an algorithm for determining a direction of arrival of the signal.

18. The system of claim 11 wherein
    the plurality of signal processing algorithms includes algorithms operative to identify presence of one or more signals of interest, and wherein
    the one or more signals of interest include pulsed radio frequency signals.

19. The system of claim 11 wherein the plurality of signal processing algorithms includes algorithms for:
    measuring a first pulse carrier frequency associated with an up-edge;
    measuring a second pulse carrier frequency associated with a down-edge; and
    calculating a pulse duration by matching the first pulse carrier frequency with the second pulse carrier frequency.

20. The system of claim 11 wherein each of the series of digitized vectors maintains vectors associated with one port of a multi-port direction finding radar warning receiver system.

21. A dual-zoom instantaneous frequency measurement dominant mode prediction system, comprising:
    a first bank of discriminators adapted to receive a signal and to provide a first series of digitized vectors of an autocorrelation function based on a first set of time delays;
    a second bank of discriminators adapted to receive the signal and to provide a second series of digitized vectors of an autocorrelation function based on a second set of time delays and;
    a plurality of dominant mode prediction processors adapted to perform signal processing algorithms on the first series of digitized vectors to obtain a first information associated with the signal and further adapted to perform signal processing algorithms on the second series of digitized vectors to obtain a second information associated with the signal;

one or more combining processors configured to receive the first information and the second information and to produce combined information.

22. The system of claim 21 wherein the combined information includes identification of an up-edge and a down-edge.

23. The system of claim 22 wherein the combined information includes a pulse carrier frequency measurement associated with the up-edge.

24. The system of claim 22 wherein the combined information includes a pulse carrier frequency measurement associated with the down-edge.

25. The system of claim 22 wherein the combined information includes:
  a first pulse carrier frequency measurement associated with the up-edge;
  a second pulse carrier frequency measurement associated with the down-edge; and
  a pulse duration measurement, wherein the pulse duration measurement is derived by matching the first pulse carrier frequency measurement with the second pulse carrier frequency measurement.

26. The system of claim 21 wherein the combined information includes direction of arrival of the signal.

27. The system of claim 21 wherein the combined information includes presence of a signal of interest.

28. The system of claim 21 wherein each of the first and second series of digitized vectors is associated with a respective port of a multi-port direction finding radar warning receiver system.

* * * * *